United States Patent [19]
Brill

[11] 3,738,089
[45] June 12, 1973

[54] EXHAUST GAS FILTER CONSTRUCTION

[76] Inventor: Robert Brill, 815 Noble Court, Golden, Colo. 80401

[22] Filed: Apr. 15, 1971

[21] Appl. No.: 134,260

[52] U.S. Cl. ...................... 55/310, 55/314, 55/319, 55/480, 55/500, 55/DIG. 30, 60/311
[51] Int. Cl. ............................................. B01d 46/30
[58] Field of Search ........................... 55/310–314, 55/319, 478–481, 493, 504–506, 510, 517–518, DIG. 30; 60/311

[56] References Cited
UNITED STATES PATENTS

| | | | |
|---|---|---|---|
| 1,479,714 | 1/1924 | Herdle | 55/DIG. 30 |
| 2,524,588 | 10/1950 | Bechtel | 55/505 |
| 2,559,983 | 7/1951 | Miller | 55/517 X |
| 2,799,357 | 7/1957 | Warnecke et al. | 55/506 X |
| 3,129,078 | 4/1964 | Hobbs | 55/DIG. 30 |
| 3,162,516 | 12/1964 | Dwyer | 55/DIG. 30 |
| 3,224,171 | 12/1965 | Bowman | 55/478 X |
| 3,421,315 | 1/1969 | Aoi | 55/DIG. 30 |

*Primary Examiner*—Frank W. Lutter
*Assistant Examiner*—Vincent Gifford
*Attorney*—C. B. Messenger

[57] ABSTRACT

An exhaust gas filter unit for internal combustion engines which utilizes a removable filter supported by a canister and disposed within a shell. The canister and filter are removed for reorienting, cleaning and/or replacing the filter medium. Cooperative construction, interlock and support features of the shell and canister facilitate disassembly and make use of an economical fibered filter medium possible. A bypass outlet is provided, and a gravity type control allows flow therethrough under maximum exhaust flow conditions.

6 Claims, 7 Drawing Figures

PATENTED JUN 12 1973　3,738,089

INVENTOR
ROBERT BRILL
BY
ATTORNEY

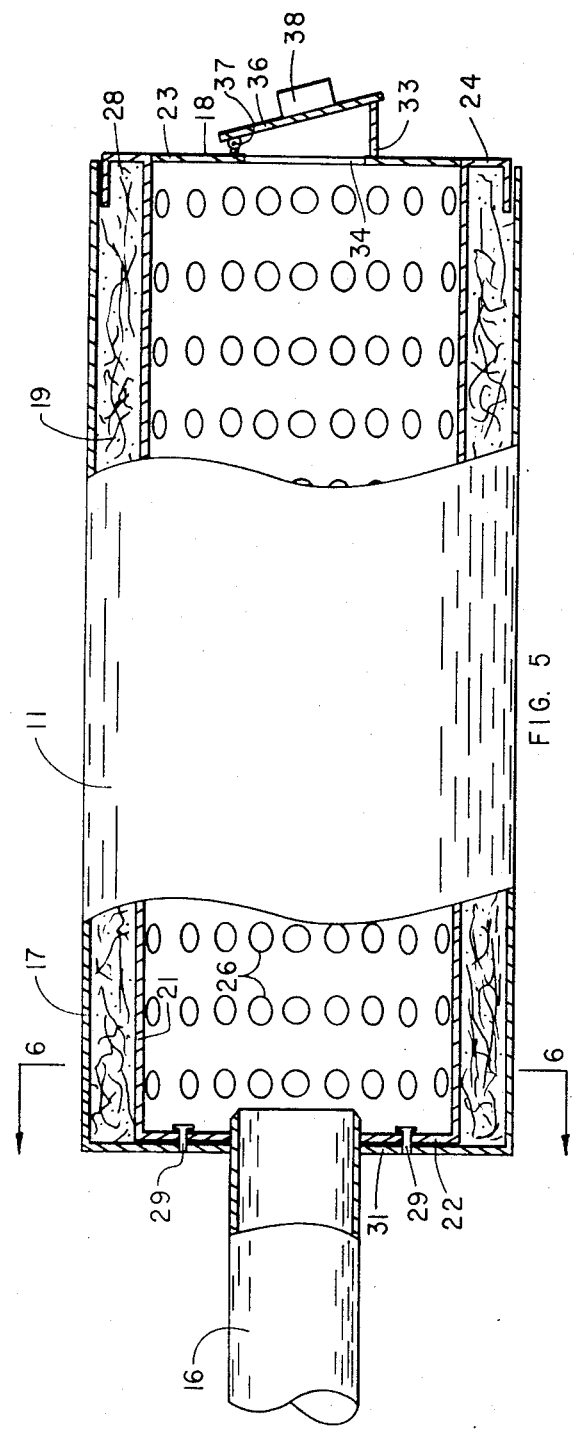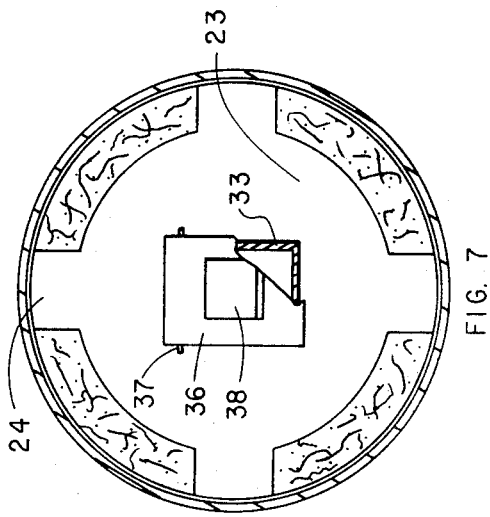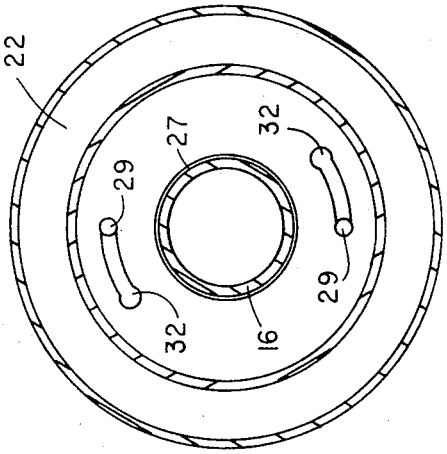

EXHAUST GAS FILTER CONSTRUCTION

BACKGROUND OF THE INVENTION

The present device is intended for use on vehicles to clean the exhaust gases emitted thereby. In part the filter unit is intended for use on existing automobiles in order to scrub and clean the gases now passing through exhaust mufflers. The filter unit itself, however, has sound absorbing qualities, and, accordingly, it provides a muffler capability in addition to its gas filtration uses.

Presently widespread attention is being given to systems for eliminating the noxious and smog producing discharges from internal combustion engines. Primarily attention is directed to the design of complete new systems that will minimize the emissions from internal combustion engines of new design. While such efforts will reduce the overall problem, it is also true that millions of presently used vehicles also contribute to the pollution problem, and something needs to be done to clean up the exhaust discharge from such existing vehicle units. The present unit provides means for improving the exhaust performance of existing vehicles and also provides an additional exhaust gas cleaning unit that may be used in conjunction with anti-pollution systems of the latest design and with systems yet to be developed.

It is recognized that others have previously designed and provided filter units for automotive exhausts, but in general it is thought that such units have been too expensive to buy and to maintain and to service. The present invention is intended to satisfy cleaner exhaust gas requirements in a more economical and serviceable manner.

SUMMARY OF THE INVENTION

The present invention provides a device that may be coupled in the discharge system of an internal combustion engine to receive the exhaust gases therefrom. A supporting shell encloses a canister having a perforated wall so that the exhaust gases admitted to the interior of the canister pass outwardly therefrom to course through a fibered type filter medium disposed on the exterior of the canister and within the supporting shell. The exhaust gases are then under normal conditions emitted from openings provided between the canister and the shell at the rear of the device. With such arrangement the exhaust gases will travel through a considerable thickness of filter medium, and any solid particles carried by the exhaust gases will be trapped in the filter medium. The canister and the filter medium disposed thereon can be removed for cleaning or replacing the filter medium. Under conditions where the filter medium has become clogged or where a maximum flow of exhaust gas is produced (as under maximum power or maximum speed conditions) a bypass will be opened allowing direct passage of the exhaust gases from the internal canister and out to the atmosphere. Changeable weights are provided so that the actual gas flow will be controlled and opposed by gravitational influences.

BRIEF DESCRIPTION OF THE DRAWINGS

FIG. 5 is a side view in partial cross-section showing an assembled unit, FIG. 6 is a cross-sectional view taken along the line 6—6 of FIG. 5, and FIG. 7 is an end elevation showing the outlet end of the unit.

DESCRIPTION OF THE PREFERRED EMBODIMENT

Figure 1:
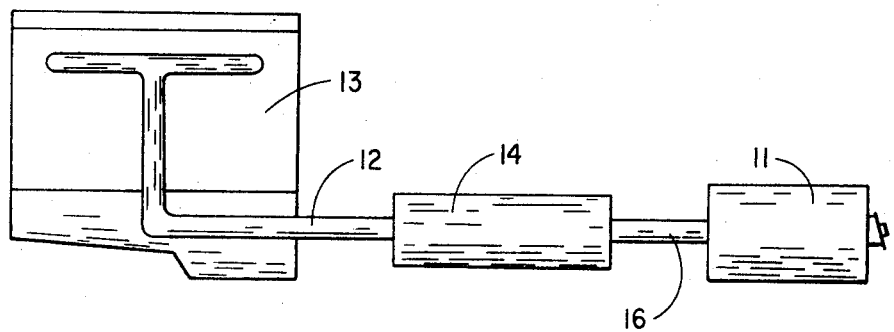
FIG. 1 is a diagrammatic representation of an internal combustion engine showing use of the invention in an exhaust system that includes a muffler.

The general use of the present type filter units 11 is shown in FIG. 1, where the unit is disposed as the last component of an exhaust system 12 for an internal combustion engine 13. Exhaust gases emitted by the engine 13 are introduced into a muffler 14 in order to silence the discharge and thereafter are conducted by a tail pipe 16 into the inlet of the filter unit 11.

Figure 2:
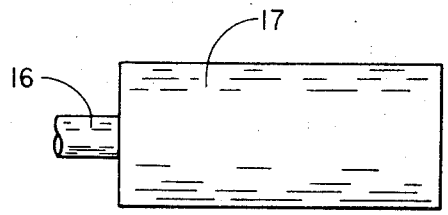
FIG. 2 is a side elevation of the support shell.
Figure 3:
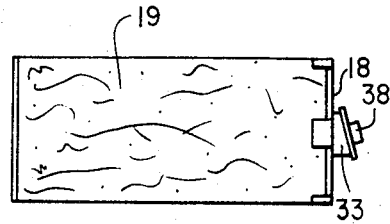
FIG. 3 is a side elevation showing the filter medium disposed about the internal canister.
Figure 4:
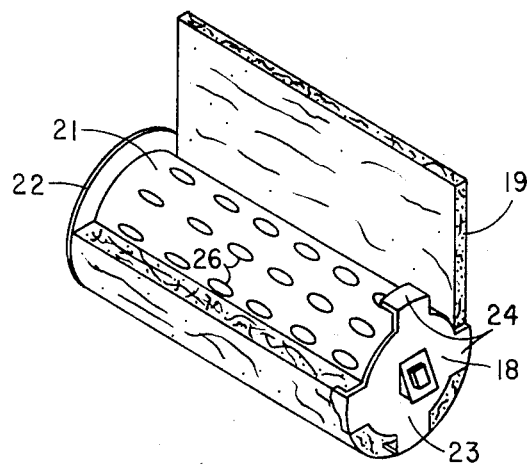
FIG. 4 is a perspective drawing showing installation and removal of the filter medium.

As shown in FIG. 2, the filter unit is comprised of a hollow cylindrical shell 17 that is adapted to receive and support a canister 18 shown in FIG. 3. A filter medium 19 is disposed about the cylindrical surface 21 of the canister 18 between a front flange 22 and a rear closure 23 which provides radially disposed support clips 24. The cylindrical surface 21 is provided with a plurality of perforations 26. Front flange 22, as shown in FIGS. 5 and 6, provides an entrance opening 27 adapted to closely fit about the tail pipe 16 so that exhaust gases from the tail pipe will be introduced into the interior of the cylindrical surface 21 of canister 18. Direct passage through the canister is blocked by the rear closure 23, and, accordingly, the exhaust gases flow outwardly at right angles to their initial movement through perforations 26 and into filter medium 19. Within the filter medium 19 the gases are redirected at right angles to move along a passage of torus shaped cross-section to a point of emission at the end edge 28 of the filter medium which is disposed at the rear end of the unit 11. Complete circular discharge is interrupted only by the support clips 24.

Since the cross-sectional area of the discharge is considerably in excess of the size of the inlet opening 27 or of tail pipe 16, little back pressure buildup is noted in connection with use of the present filter unit unless the filter becomes clogged with entrapped materials. When the filter does become clogged, the canister 18 may be easily removed and the filter may then be reversed thereon to expose unclogged portions, or the filter medium may be washed to remove the entrapped particles. Further, since a relatively economical filter medium may be used, a new filter medium can be cheaply applied. Preferably, the fibered types of filter mediums are to be used with those made of glass or other synthetic fibers being of prime interest. Such filter medium is serviceable and cheap, and it can usually be easily washed for reuse.

In order to hold the canister within the shell 17, headed pins 29 are provided on the shell end 31 for mating engagement in the slot openings 32 of end flange 22. With this arrangement the canister is applied so that the headed pins 29 pass through the circular portion of the slot openings 32, and thereafter the canister is rotated to the lock position illustrated in FIG. 6.

The filter unit shown and described makes it possible to clean the emissions from existing vehicles, and it would further make it possible to assure the elimination of all solid particulate emissions from all gasoline engines. It is recognized, however, that the unit must be serviced in order to prevent a buildup in back pressure from the exhaust system. In order to keep any undesirable buildup of back pressure from hindering the operation of the engine, a bypass is provided whereby the exhaust gases or portions thereof may be discharged without passing through the filter medium 19. The bypass construction as shown in FIGS. 5 and 7 provides an outlet 33 disposed on the rear closure 23 of canister 18. An opening 34 in the rear closure 23 communicates with outlet 33. A bypass valve 36 is mounted by a hinge pin 37 to close off the passage through the outlet 33 under normal operating conditions. The outlet 33 itself has an angled exit face, and the weight of the valve 36 will normally tend to hold the valve 36 in closed position. Where maximum flow conditions exist, however, the valve 36 will open to provide a bypass discharge from the filter unit 11. Different weights 38 may be applied to the valve 36 to regulate the opening and closing of the bypass. Preferably, the total weight of the valve 36 and of an applied weight 38 should be adjusted to keep the bypass closed except under maximum engine operating conditions. Where maximum power is being expended by the engine or under conditions of maximum speed, it could be beneficial for the bypass to open so that excess back pressures will not be encountered. When regulated to take care of maximum operating conditions, the bypass will also serve to prevent improper engine operation where the filter medium 19 of the unit 11 has become clogged by excess accumulated dirt. If the filter meidum is clogged, the bypass will be opened under less than maximum engine operating conditions. Further, since the filter unit 11 itself provides a level of sound absorption for the exhaust system, this change in flow conditions will be readily observed by the operator. This observed change in sound will advise the operator that the filter medium needs to be changed or cleaned. The changed sound level characteristics of the present unit provide a convenient signal indicating that filter servicing is necessary.

I claim

1. A filter unit for cleaning the gases emitted by internal combustion engine exhaust systems comprising an enclosure shell having a generally open exit end and a forward or upstream wall having an entrance opening therein, interconnecting means at said entrance opening in flow connection with the exhaust system of said engine whereby engine exhaust gases are delivered to the interior of said shell, a longitudinally removable canister disposed within said shell having one generally closed end disposed rearwardly or downstream and a forward or upstream end having an opening therein for flow connection with said interconnecting means whereby the engine exhaust gases are delivered to the interior of said canister and whereby the closed end of said canister blocks direct axial flow of introduced gases through said unit, said canister further providing a plurality of perforations in longitudinally extending walls thereof whereby the otherwise confined gases subjected to back pressure influences of the engine may escape laterally through such perforations and into an axially oriented filter unit exit passage defined between the exterior of said canister and the interior of said shell, a filter medium blanket of loosely matted fibrous material disposed about said canister in said exit passage and in contacting relationship with said canister and shell whereby said gases are constrained to flow axially through said filter materials for the entrapment of solids particulate matter carried by said gases before said gases are discharged rearwardly from a rear and visually exposed terminal end of said filter medium blanket, clip means for releaseably holding said canister and shell in assembled spaced relationship whereby the canister and filter medium blanket may be longitudinally removed for further observation and servicing, and a valve element at the downstream or generally closed end of said canister in position directly exposed to the engine exhaust pressure influences therein, said valve being operative to provide a bypass discharge of exhaust gases therethrough when gas pressures exceed desirable levels whereby excessive engine back pressure influences are avoided.

2. Structure as set forth in claim 1 wherein the opening in the forward end of said canister and said interconnecting means are operative to hold the canister centered with respect to said shell at the forward end of said unit and wherein said clip means are radially disposed at the downstream end of said unit to hold said canister and shell in concentric positions.

3. Structure as set forth in claim 2 and further comprising axially extending lock elements at the forward end of said filter unit disposed concentrically with said interconnecting means for releasably holding said canister and shell members in assembled relationship.

4. Structure as set forth in claim 3 wherein said lock elements include an axially extending pin mounted on the interior of the forward wall of said shell and a cooperatively positioned slot provided by the forward end of said canister at a position disposed outwardly from said upstream opening with said pin and slot combination being selectively engaged and released by rotation of said canister with respect to said shell.

5. Structure as set forth in claim 1 and further comprising an outwardly extending flange at the forward end of said canister providing with said canister and clip means a spool type construction and wherein said filter medium blanket is of glass fiber stock material disposed about the derived spool in position intermediate said outwardly extending flange and said clip means whereby all of said filter medium blanket will be removed with said canister when the canister is removed from said shell.

6. Structure as set forth in claim 1 wherein an angularly disposed opening is provided in the generally closed end of said canister with said valve being disposed at said opening and with the weight of said valve normally tending to hold the valve in closed position.

* * * * *